United States Patent
Rising, III et al.

(10) Patent No.: US 6,845,487 B1
(45) Date of Patent: Jan. 18, 2005

(54) METHOD AND AN APPARATUS FOR IMPLEMENTING A KEY FRAME

(75) Inventors: Hawley Knox Rising, III, San Jose, CA (US); Ali J. Tabatabai, Beaverton, OR (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 575 days.

(21) Appl. No.: 09/727,317

(22) Filed: Nov. 28, 2000

Related U.S. Application Data

(60) Provisional application No. 60/168,433, filed on Nov. 30, 1999.

(51) Int. Cl.$^7$ ................................. G09G 5/00
(52) U.S. Cl. ................... 715/721; 715/951; 707/102
(58) Field of Search ................. 345/719–725, 345/951; 707/1–5, 100–103; 358/1.11–1.18

(56) References Cited

U.S. PATENT DOCUMENTS

| | | | | |
|---|---|---|---|---|
| 5,579,471 A | * | 11/1996 | Barber et al. | 345/700 |
| 5,915,250 A | * | 6/1999 | Jain et al. | 707/100 |
| 5,956,026 A | * | 9/1999 | Ratakonda | 345/723 |
| 6,119,123 A | * | 9/2000 | Elenbaas et al. | 707/102 |
| 6,166,735 A | * | 12/2000 | Dom et al. | 345/749 |
| 6,236,395 B1 | * | 5/2001 | Sezan et al. | 345/723 |
| 6,282,549 B1 | * | 8/2001 | Hoffert et al. | 707/104.1 |
| 6,466,209 B1 | * | 10/2002 | Bantum | 345/589 |
| 6,492,998 B1 | * | 12/2002 | Kim et al. | 345/723 |

* cited by examiner

Primary Examiner—Raymond J. Bayerl
Assistant Examiner—Shawn M. Becker
(74) Attorney, Agent, or Firm—Blakely, Sokoloff, Taylor & Zafman LLP.

(57) ABSTRACT

The invention relates to a key frame such as a KeyFrameDS. A list of key, length, and value (KLV) attribute groups are used in the KeyFrameDS. The KeyFrameDS may be modified by changing, for example, an attribute group. This may be accomplished, for example, by changing one of its attributes, such as the value attribute.

19 Claims, 4 Drawing Sheets

METHOD AND AN APPARATUS FOR IMPLEMENTING A KEY FRAME

This application claims the benefit of the earlier filing date of provisional applications of Hawley K. Rising, III and Ali J. Tabatabai entitled, "A Proposed Structure for the Key Frame DS," Ser. No. 60/168,433, filed Nov. 30, 1999 and "A Method and an Apparatus for Implementing A Key Frame," Ser. No. 60/168,433, filed October 20, 2000.

BACKGROUND

FIELD OF THE INVENTION

This invention relates generally to describing and accessing of data. More specifically, the invention relates to mechanisms and techniques that enable data related to an audiovisual work to be described and accessed.

BACKGROUND

Key frames have a variety of uses in terms of describing data pertaining to an audiovisual work. A key frame is a single frame that tags a plurality of frames related to a sequence of images that meet certain criteria designated by a user. For example, a description such as a title of a scene to a movie, or other information related to a particular scene may be recorded in a key frame. In this manner, the key frame is able to provide a summary of an audiovisual work that allows near random access to frames within the audiovisual work. In addition to describing audiovisual data, key frames may also be used for comparing a video with another video or for reviewing a summary of the series of frames in a document that is generated from the key frame.

One disadvantage to a key frame is that it is generally static. Once a key frame is made, the key frame generally cannot be updated. If the criteria for the key frame is changed, a new key frame must be created. Creating a new key frame is time consuming and expensive. It is therefore desirable to have a system that addresses this disadvantage.

SUMMARY

One embodiment relates to a key frame such as a key frame description scheme (KeyFrameDS) that may be used to describe or summarize a work such as an audiovisual work based upon a criterion or criteria provided by, for example, a user. KeyFrameDS, that includes a set of attributes such as other description schemes, describes changes that are to be made to the set of description schemes. KeyFrameDS may use attribute groups containing sets of attributes such as the key, length, and value (KLV) to accomplish this task.

The KeyFrameDS may be updated in a variety of ways. In one embodiment, KeyFrameDS is updated by modifying an attribute such as the value attribute. In another embodiment, KeyFrameDS is updated by adding, deleting, or changing description schemes attached to the value attribute of a KLV attribute group. These methods for updating the KeyFrameDS allow a user to select, for example, another set of frames in an audiovisual work to provide another description or summary to the audiovisual work. Updating the KeyFrameDS may be accomplished by a sender (e.g., a server, a broadcast unit, etc.) sending a command such as a commandDS to a receiver (e.g., client, set-top box, etc.). CommandDS includes instructions such as to add, change, or delete one or more attributes or to add, change or delete a description scheme.

One example of updating a KeyFrameDS relates to a person, driving in a vehicle with a portable computer device, who is initially interested in touring historical sites in a city. A KeyFrameDS, that includes the attribute groups $K_1L_1V_1$, may be used to provide a summary of these historical sites. At about noon, the person may be interested in finding restaurants in the city. In order to view a list of restaurants, the person inputs information that changes the value attribute ($V_1$) in the $K_1L_1V_1$ attribute group in the KeyFrameDS that searches historical sites to restaurants. The length of bytes associated with the value attribute typically changes when the value attribute changes, so the attribute $L_1$ is modified to attribute $L_2$. The remainder of the information in the KLV attribute group of the KeyFrameDS remains unchanged by the user such as the city in which the search is to be performed. The computer system executes this request and presents a list of restaurants to the user.

Another embodiment of KeyFrameDS involves placing entities such as other description schemes into the value attribute of a KLV attribute group in a KeyFrameDS in a universally recognizable format, such as in a description definition language (DDL). By using KeyFrameDS that have these characteristics, the value attribute of the KeyFrameDS may be modified regardless of syntactic or semantic distinctions that may exist between, for example, semantic data that describes a syntactic audiovisual object. Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
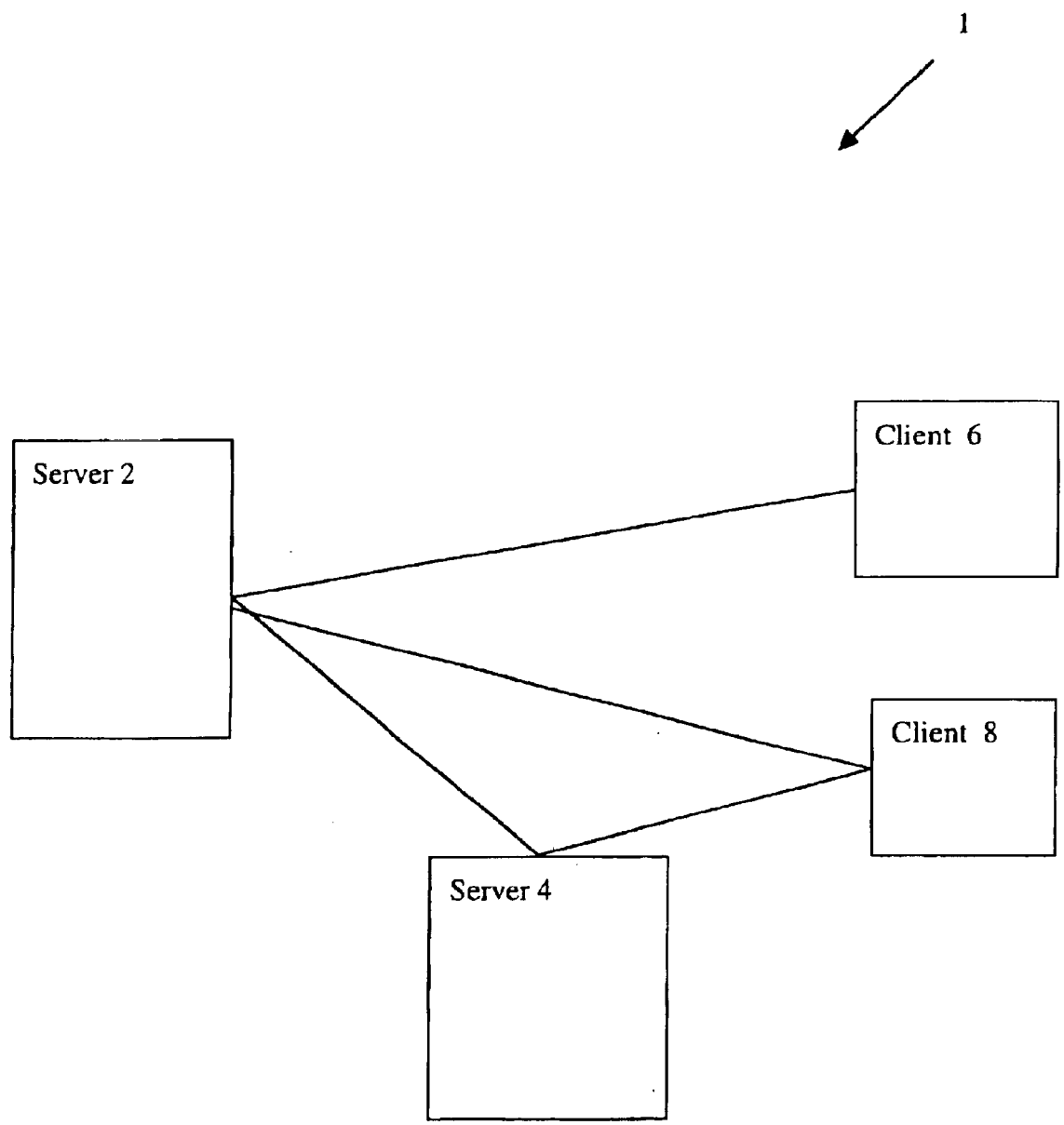
FIG. 1 illustrates a block diagram of one embodiment of a computer system that includes servers.

When creating an audiovisual work, it is desirable to provide a description or a summary of portions of the audiovisual work that contain certain criteria designated by a person such as a user of a computer system. The criteria may be changed to incorporate different information. To accommodate the changed criterion or criteria, one embodiment allows a key frame such as a key frame description scheme (KeyFrameDS) to be used. KeyFrameDS is a description scheme that includes other description schemes. To adjust for the changed criteria, the KeyFrameDS is updated.

To understand the manner in which the KeyFrameDS may be modified, an explanation of the structure of the KeyFrameDS is provided. The KeyFrameDS includes a list of attribute groups. Each attribute group includes a key, length, and value attribute (KLV). The key attribute, typically an object/class, describes other description schemes. For instance, the key attribute may indicate that the key frame relates to the rules of a soccer game that is to be broadcast. The length attribute generally refers to the number of bytes associated with the value attribute. The value attribute, that includes one or more elements, is used to instantiate the object or class provided by the key attribute. The value attribute is where a set of description schemes attach thereto. Typically, the value attribute and the length attribute are modified whereas the key attribute generally remains unchanged when values are altered. If the description schemes themselves are altered, the key attribute changes to reflect the new description scheme name.

Updating the KeyFrameDS includes adding, deleting, or modifying attributes in attribute groups contained in KeyFrameDS. There are at least two general ways in which the KeyFrameDS is updated. First, the value contained in a value attribute of a KLV attribute group of the KeyFrameDS may be modified. Second, the value attribute may be modified by updating the description schemes contained in or pointed to by the value attribute. Updating the KeyFrameDS may be accomplished by a sender (e.g., a server, a broadcast unit, etc.) sending a command such as a commandDS to a receiver (e.g., client, set-top box, etc.).

The commandDS contains information for making a change to at least one attribute of the KeyFrameDS or add, delete, or change a description scheme. The commandDS may require that the change occur at read time or any other suitable time.

By implementing techniques of the invention, a user may update a KeyFrameDS during, for example, a broadcast of a sports program on a television. Additionally, the state of the descriptions may change to reflect a change to the underlying audiovisual content.

In the following description, numerous specific details such as specific materials, processing parameters, processing steps, etc., are set forth in order to provide a thorough understanding of the invention. One skilled in the art will recognize that these details need not be specifically adhered to in order to practice the claimed invention. In other instances, well known processing steps, materials, etc., are not set forth in order not to obscure the invention.

Figure 2:
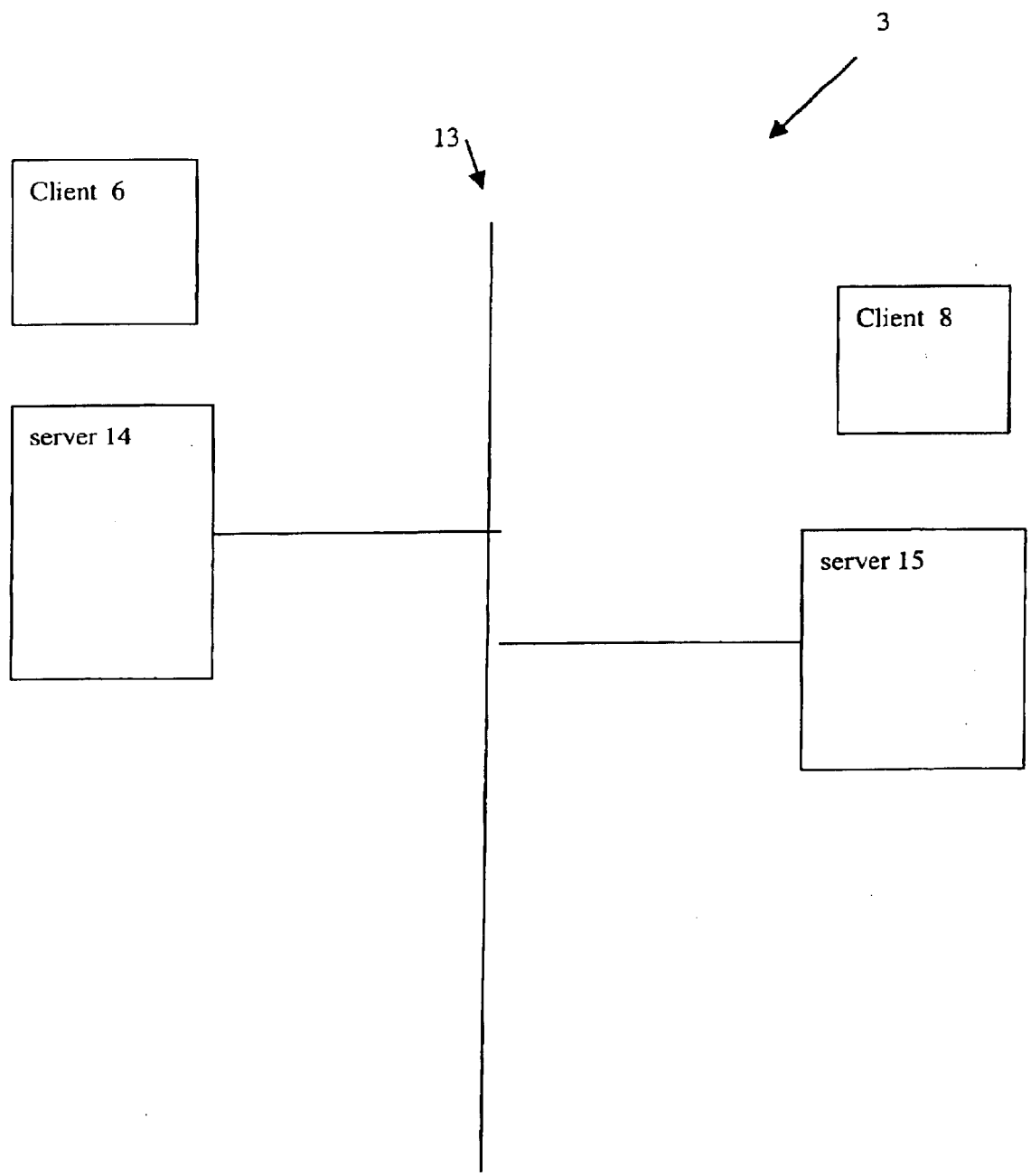
FIG. 2 illustrates a block diagram of one embodiment of another computer system related to a peer-to-peer system.
Figure 3:
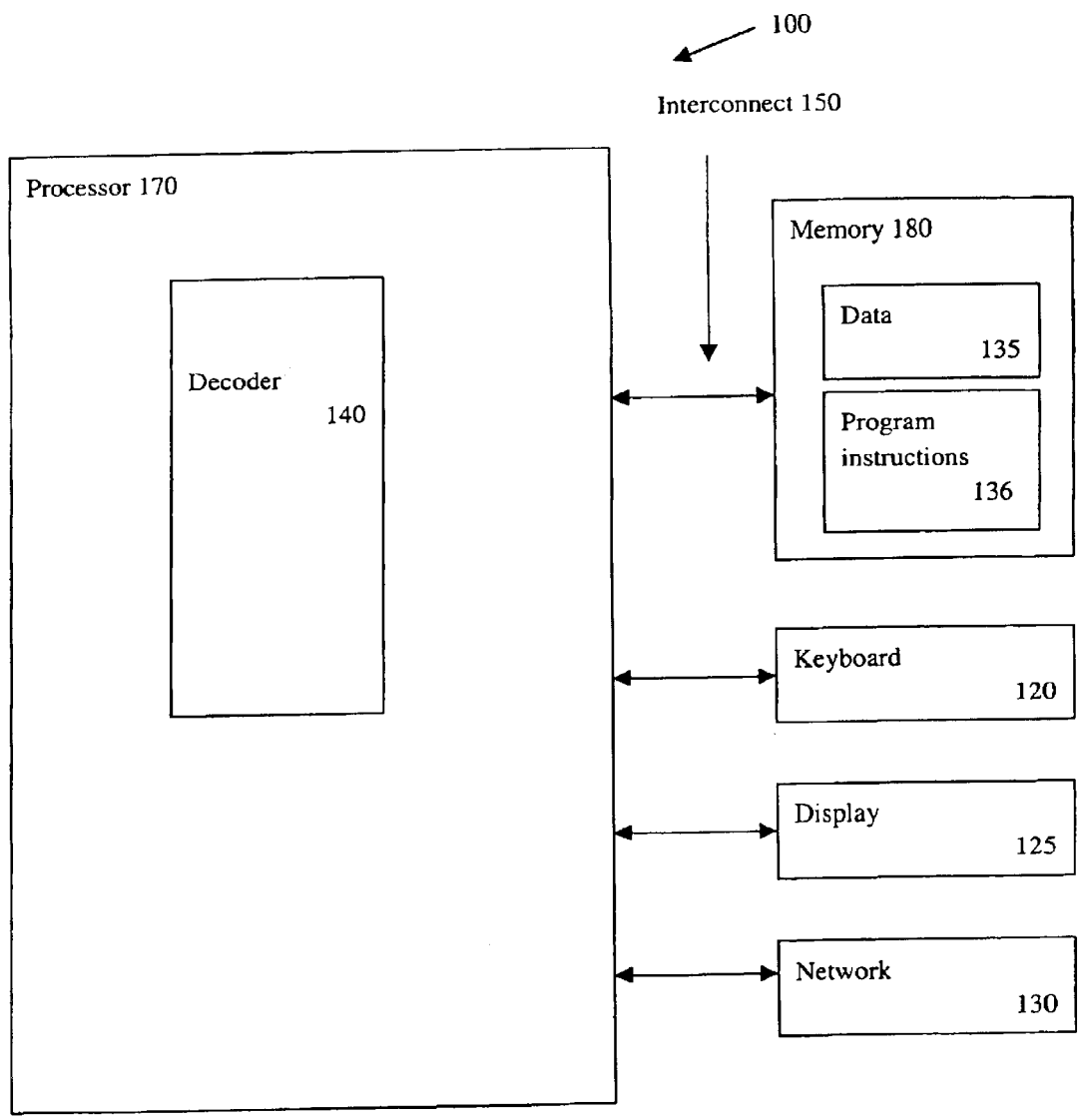
FIG. 3 illustrates a block diagram of another embodiment of a computer system.

FIGS. 1 through 3 illustrate computer systems that may implement various features of a KeyFrameDS to change attributes such as description schemes. To better understand techniques of the invention that are implemented using various computer systems, definitions of terms are provided. A description scheme is a characteristic associated with the data and may be the value of a value attribute. Such attributes may include syntactic description schemes (e.g., arrangement of words), semantic description schemes (e.g., meanings of words), a mixture of these description schemes, or any other suitable characteristics of data. The attributes of the KeyFrameDS may be dynamically changed by a user, a server, a client, or any other suitable device.

The KeyFrameDS includes attributes such as key, length, and value (KLV), grouped into the KLV attribute groups. Key attribute is a tag that uniquely identifies an object/class (e.g., a set of data with similar characteristics). A key attribute describes a description scheme and typically remains unchanged. Length attribute is the number of bytes associated with the value attribute. The length attribute may be skipped if a receiver (e.g., client, set-top box, etc.) of the KeyFrameDS does not recognize the object/class thereby reducing the amount of time to process a KeyFrameDS. The value attribute, on the other hand, is used to instantiate the object/class.

Given this description of KeyFrameDS and attributes, a block diagram of one embodiment of computer system 1 that implements principles of the invention is presented in FIG. 1.

I. Server Implementation of Techniques of the Invention

KeyFrameDS interactions may be implemented on a server-side through servers (2, 4) and on the client-side through clients (6, 8). Each of these implementations is discussed below.

A. Server-Side Interaction with a Key Frame

Computer system 1 includes servers (2, 4) and clients (6, 8). Clients (6, 8) are applications that operate on a personal computer or a workstation to input data used in key frames. Servers (2, 4) are computers or devices on a network that manage network resources. For example, server 2 is a computer and storage device dedicated to the task of storing data and searching KeyFrameDS. Program instructions (e.g., computer program, software, etc.) reside in server 2. Program instructions that may enhance techniques of the invention include a standard generalized markup language such as extensible markup language schemes (XML) and description definition language (DDL). Scheme XML uses two types of data items such as elements and attributes in order to change a description in, for example, a KeyFrameDS, related to an audiovisual work.

Another embodiment of KeyFrameDS involves placing the key frame in a universally recognizable format, such as in the DDL. By using KeyFrameDS that have these characteristics, an attribute group such as the value attribute group of the KeyFrameDS may be modified regardless of syntactic or semantic distinctions that may exist between, for example, semantic data that describes a syntactic audiovisual object. In comparison to the functions of server 2, server 4 may be a file server, print server, or any other suitable server to perform certain functions.

On the server-side, a mechanism is used for updating KeyFrameDS. There are at least two general ways in which a KeyFrameDS is updated. In one embodiment, KeyFrameDS is updated by modifying an attribute such as the value attribute. In another embodiment, KeyFrameDS is updated by attaching, adding, deleting, or changing description schemes.

Updating the KeyFrameDS may be accomplished by a sender such as server 4 sending a commandDS to a receiver such as server 2. CommandDS contains the information to update the KeyFrameDS. For example, commandDS includes changes to at least one description scheme by indicating that a KLV attribute group, for instance, $K_1L_1V_1$, should be changed to the KLV attribute group $K_1L_2V_2$. CommandDS identifies that the key is $K_1$ which is the same as the key attribute in the original KLV attribute group in the original KeyFrameDS. This identifies the particular key frame (e.g., KeyFrameDS) to be updated and, in particular, the attribute to be updated in the KeyFrameDS. $L_2$ is the length of the new value attribute $V_2$.

CommandDS allows a receiver to add, change, or delete parts of a description (e.g., an audio description scheme related to descriptions of sound) dynamically based upon the user preferences (e.g., recordation of a title of a movie, important scenes in a movie, etc.) and or domain-specific attributes. The commandDS may also contain information for making the change during read time or at any other suitable time. The code for commandDS is as follows:

```
<datatype name='commandTypes'>
    <basetype name='string'/>
    <enumeration>
        <literal>add</literal>
        <literal>change</literal>
        <literal>delete</literal>
    </enumeration>
</datatype>
<DSType name = 'CommandDS/>
    <attribute name = 'command' type = 'commandTypes'
```

-continued

```
minOccurs='1' maxOccurs='1'/>
    <attrGroupRef name = 'KLV'/>
</DSType>
```

As noted in the commandDS code, the instructions include, for example, to add, change, or delete information associated with KeyFrameDS. CommandDS, executed on server 2, may automatically update the KeyFrameDS and then search for data in a database such as that which is stored on server 2 that complies with the requirements established by the new KeyFrameDS. To illustrate, commandDS may require that an attribute for the KeyFrameDS be modified based upon a factor such as time (e.g., every fifteen seconds an attribute such as the value attribute automatically changes based upon program instructions executed on the server).

The commandDS may require that an attribute or attributes (e.g., description schemes) attached to the KLV attribute group of a key frame such as KeyFrameDS change, for example, every fifteen seconds. To illustrate, a KeyFrameDS such as gameKeyFrameDS may be used in a sports program such as a soccer game. If a soccer game is being played, one screen of a split screen may be used to display information pertaining to the soccer players. GameKeyFrameDS may be used to automatically control the type of information displayed on, for example, a graphical user interface (GUI) of client 6. GameKeyFrameDS may include a plurality of attributes such as a player description scheme (playerDS), soccer description scheme (soccerDS), audio description scheme (audioDS), and transcoding description scheme (transcoding DS). Each description scheme may appear on a GUI as a hyperlink. In order to automatically change information related to a soccer player, an attribute such as the playerDS may be used that links the player's name to information such as the player's age, height, weight, and a short summary of the player's career history. Other information that may be related to playerDS includes a color descriptor to describe the color of the player's uniform.

Server 2 could automatically change the attribute such as playerDS every fifteen seconds by changing the name of a first player to the name of a second player player. The player's name may be changed by, for instance, the program instructions alphabetically rotating players last name every fifteen seconds. Information such as age, height, weight, and career history that is associated with the name of the player is automatically updated when the player's name is changed. This new information is then sent over interconnect 13 to client 6. A user may then view the new gameKeyFrameDS and the data associated with the gameKeyFrameDS.

Other attributes that may be automatically modified by the program instructions include other descriptive schemes such as soccer description scheme (soccerDS), audio description scheme (audioDS), transcoding description scheme (transcodingDS), and time description scheme (timeDS). Each of these descriptive schemes is described below.

SoccerDS contains descriptions related to the rules associated with the game of soccer. For example, this attribute may indicate that the soccer ball must be hit by a player into an area defined by goal posts and a net in order for a point to be added to the team's score. Another rule may be that a soccer player cannot hold the soccer ball in his or her hands. Various other suitable rules may be incorporated into this attribute.

AudioDS contains audio related descriptions for sound such as sound effects, instruments, speech recognition, music, or any other suitable audio description. For example, audioDS may provide the voice of the sportscaster broadcasting the event.

TranscodingDS contains descriptions related to the coding type of the audiovisual work such as a picture. For example, transcoding may involve converting from a picture format to another format (e.g., Moving Picture Experts Group-2 Standard (MPEG-2) to H. 263).

TimeDS is generally composed of two elements: the start time point and the duration of a particular segment. Time stamping is used to mark areas in a multimedia work. To illustrate, a time stamp may be used to mark a certain play in the soccer game in order to allow that play to be replayed for the audience. Any one of these description schemes may be automatically modified by server 2 as explained herein.

In addition to updating attributes (e.g., description schemes), another embodiment relates to weighting attributes of a KeyFrameDS. For example, one attribute may be assigned a weight of "1" that means very important such as playerDS and timeDS while the weight of "5" is assigned to another attribute and means least important such as soccerDS.

In another example, an attribute such as a group name may be considered very important. Therefore, this attribute is assigned a value of importance of "1" such as for the key and length code provided below.

```
<attrGroup name = 'REF_ID'
    <attribute name = 'id' type = 'ID' minOccurs='1'
    maxOccurs='1'/>
    <attribute name = 'href' type ='uri' minOccurs='1'
    maxOccurs='1'/>
</attrGroup>
<attrGroup name = 'KLV'
    <attribute name = 'key' type = 'ID' minOccurs='1'
    maxOccurs='1'/>
    <attribute name = 'length' type='integer' minOccurs='1'
    maxOccurs='1'/>
    <attribute name = 'value' type ='char' maxOccursPar='length'/>
</attrGroup>
<datatype name='attributeWeight'>
    <basetype name='integer'/>
    <minInclusive> 1 </minInclusive>
    <maxInclusive> 5 </maxInclusive>
</datatype>
<DSType name = 'KeyFrameDS'>
    <attrGroupRef name = 'REF_ID'/>
    <SubDSOf name = 'keyFrame'/>
    <attribute name = 'size' type = 'int'/>
    <seq minOccurs = '1' maxOccursPar = 'size'/>
    <attGroupRef name = 'KLV'/>
    <attribute name = 'weight' type = 'attributeWeight'
    minOccurs =
'0' maxOccurs ='1'/>
    </seq>
</DSType>
```

By allowing attributes to be weighted, server 2 or a user of a computer system is able to dynamically determine, for example, the types of attributes that should be more frequently displayed to a user.

Additionally, KeyFrameDS may mark an audiovisual work through a reference identifier (ID) by using methods known in the art. A reference ID indicates a certain location in an audiovisual work. A reference ID may include a media or a medium locator to specify the "location" of a particular image, audio, or video segment by referencing the media data. There are generally four types of medium locators such as the video segment locator, the audio segment locator, the image locator, and the sound locator. In this manner, a user may randomly access frames designated with a reference ID. It will be appreciated that other methods may be used to mark a multimedia work such as an audiovisual work.

B. Client-Side Interaction with Dynamic Key Frame

Another implementation of updating the KeyFrameDS may be performed by a user inputting and sending changes using a commandDS through, for example, client 6 to a server of the computer system shown in FIG. 1. Clients (6, 8) rely upon a server such as servers (2, 4) to perform certain operations such as to input a commandDS to update KeyFrameDS in order to access previously stored information related to the KeyFrameDS. Server 2 also allows or causes information to a KeyFrameDS to be added, changed, or deleted.

The KeyFrameDS may be updated by having one of its attribute groups or weights changed such as the KLV (key, length, and value) attribute groups, or their corresponding weights. Generally, a user will modify a KLV attribute group by modifying the value attribute since the value attribute incorporates other attributes such as description schemes. For example, information such as the shot identification, the scene identification, and key-frame building, or selecting parameters may be modified by the user through client 6. If a shot/scene identification is to be changed, server 2 resegments the video, selects new key frames at the desired segment quantization level, and sends these KeyFrameDS to client 6. The user may input attributes such as description schemes that are semantic, syntactic, or a mixture of those attributes into a client such as clients (6, 8). One means for inputting this information is by a user sending from client 6 a command such as commandDS to server 2.

Server 2 receives and executes these instructions such as commandDS from client 6. Server 2 then may access information that has been stored in server 2 or server 4 such as data that is responsive to the KeyFrameDS. For instance, a very large collection of frames that may include a variety of possible parameter settings may be stored and accessed on server 2. Server 2 selects segments from the stored KeyFrameDS that represent those segments and that fit the parameters inputted by a user. Server 2 then sends this new KeyFrameDS and data corresponding to the new KeyFrameDS to client 6.

On the other hand, if the segments are to remain unchanged, the process reselects the KeyFrameDS for each segment and sends these KeyFrameDS' to client 6. If a query is processed, the KeyFrameDS are not in temporal order and the reordering of the KeyFrameDS is assumed.

The KeyFrameDS structure, that uses DDL, provides greater flexibility by allowing attributes such as semantic, syntactic, a mixture of semantic and syntactic attributes, or any other suitable characteristics of data to be added, changed, or deleted by automatically modifying the attribute groups in the KeyFrameDS or by a user sending a commandDS that instructs that certain changes be made. It will be appreciated that the KeyFrameDS structure and the use of commandDS to change a content of the key frame structure may also be extended to define other description schemes with similar requirements.

II Peer-to-Peer System Implementation of Techniques of the Invention

It will be appreciated that a peer-to-peer system illustrated in FIG. 2 may be used in the KeyFrameDS interactions. Peer-to-peer system 3 is a type of network in which each workstation such as servers (14, 15) have equivalent capabilities and responsibilities. For example, there may be two peer computers or servers on the same network. This differs from client/server architectures, in which some computers are dedicated to serving the others. Peer-to-peer networks are generally simpler and less expensive, but they usually do not offer the same performance under heavy loads.

In one embodiment, servers (14, 15) are coupled through interconnect 13. Client 6 may access the KeyFrameDS to add, delete, or change a value for an attribute or an element for an attribute in KeyFrameDS. A commandDS may be sent to client 6 from server 14 to update KeyFrameDS. Once client 6 has the initial list, updates such as in the form of adding, deleting, or modifying a KeyFrameDS may be sent from client 6 to server 14. Server 14 then updates or changes the description scheme(s) as described above. Server 15 may also perform in the same manner.

III. Computer System Implementation of Techniques of the Invention

FIG. 3 illustrates an embodiment of another computer system 100 that implements the principles of the invention. Computer system 100 includes a stand alone or portable computing device. Computer system 100 comprises a processor 170, a storage device 180, and interconnect 150 such as a bus or a point-to-point link. Processor 170 is coupled to the storage device 180 by interconnect 150. In addition, a number of user input/output devices, such as a keyboard 120 and display 125, are coupled to chip set (not shown) which is then connected to processor 170. The chipset (not shown) is typically connected to processor 170 using an interconnect that is different from interconnect 150.

Processor 170 represents a central processing unit of any type of architecture (e.g., the Intel architecture, Hewlett Packard architecture, Sun Microsystems architecture, IBM architecture, etc.), or hybrid architecture. In addition, processor 170 could be implemented on one or more chips. Storage device 180 represents one or more mechanisms for storing data such as the plurality of elements that make up an attribute which may be incorporated into a key frame such as KeyFrameDS. Storage device 180 may include read only memory (ROM), random access memory (RAM), magnetic disk storage media, optical storage media, flash memory devices, and/or other machine-readable media. Interconnect 150 represents one or more buses. (e.g., accelerated graphics port bus, peripheral component interconnect bus, industry standard architecture bus, X-Bus, video electronics standards association related to buses, etc.) and bridges (also termed as bus controllers).

While this embodiment is described in relation to a single processor computer system, the invention could be implemented in a multi-processor computer system. In addition to other devices, one or more of a network 130 may be present. Network 130 represents one or more network connections for transmitting data over a machine readable media. The invention could also be implemented on multiple computers connected via such a network.

FIG. 3 also illustrates that the storage device 180 has stored therein data 135 and program instructions (e.g., software, computer program, etc.) 136. Data 135 represents data stored in one or more of the formats described herein. Program instructions 136 represents the necessary code for performing any and/or all of the techniques described with reference to FIGS. 1, 2, and 4. It will be recognized by one of ordinary skill in the art that the storage device 180 preferably contains additional software (not shown), which is not necessary to understanding the invention.

FIG. 3 additionally illustrates that the processor 170 includes decoder 140. Decoder 140 is used for decoding instructions received by processor 170 into control signals and/or microcode entry points. In response to these control signals and/or microcode entry points, decoder 140 performs the appropriate operations.

Figure 4:
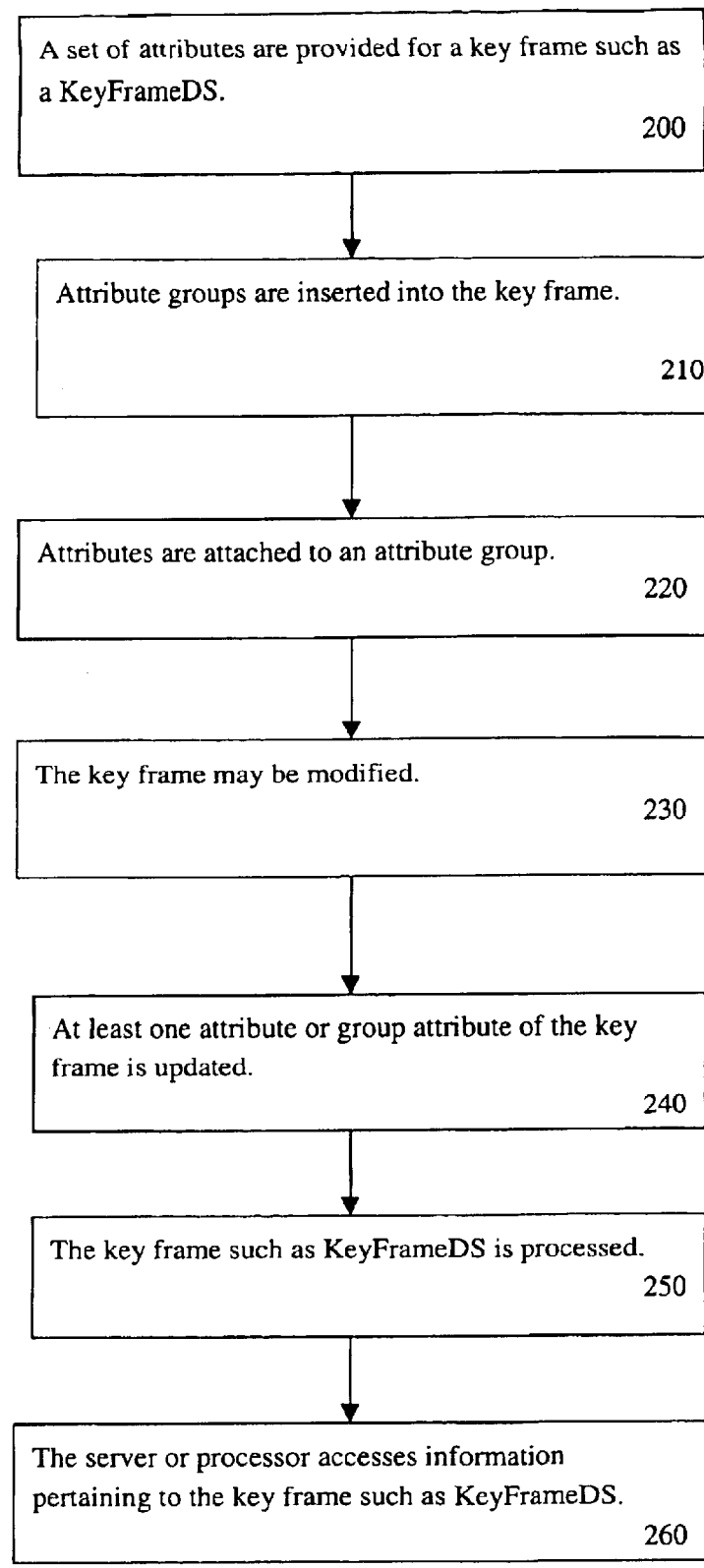
FIG. 4 illustrates a flow diagram of one embodiment for updating a key frame.

FIG. 4 illustrates a flow diagram of one embodiment for updating a key frame. At block 200, at least one attribute group, a set of attribute groups, or information pertaining to at least one description scheme is provided for an attribute such as KeyFrameDS. Attributes such as description schemes are attached to the value attribute to the KeyFrameDS. Attributes may be in the form of semantic, syntactic, or any other suitable characteristic of data.

At block 210, attribute groups are inserted into a key frame such as the KeyFrameDS. At block 220, attributes such as other description schemes are attached to an attribute group such as the value attribute. In one embodiment, a universally recognizable format such as DDL is used to insert the attributes into a KeyFrameDS. At block 230, the KeyFrameDS may be modified, for example, by a server, a user, a client, or other suitable device. A command such as a commandDS is sent to, for instance, a server that requires the server to process the KeyFrameDS to change information about the KeyFrameDS. At block 240, at least one attribute group of the KeyFrameDS may be updated. Typically, when updating a KLV attribute group, the value attribute or the length attribute are modified whereas the key attribute that describes the other description schemes generally remains unchanged, unless one is changing the description scheme to which the KLV attribute group refers. Alternatively, at least one attribute is added, deleted, or changed that is attached to the KeyFrameDS. At block 250, a key frame such as KeyFrameDS is processed. At block 260, the server or processor accesses stored information pertaining to the KeyFrameDS. This information may be stored in a storage medium or media such as a database or any other suitable means. In another embodiment, the server may connect to a network such as the Internet to access information.

In the foregoing specification, the invention is described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:

creating a key frame by instantiating a set of content description schemes and descriptions according to a key frame description scheme, the key frame description scheme comprising a list of KLV (key, length, value) attribute groups, each KLV attribute group comprising a key attribute that identifies a content description scheme data type, a length attribute that specifies a length for a value attribute, and the value attribute that incorporates further attributes used to instantiate the data corresponding content description scheme, wherein a content description scheme comprises at least one of another content description scheme and a description; and updating the key frame by re-instantiating a content description scheme as a result of performing at least one of modifying the corresponding KLV attribute group by modifying one of the key attribute, the length attribute, and the value attribute, and modifying a weight value attached to the corresponding KLV attribute group.

2. The method of claim 1, further comprising:

describing the KLV attribute groups in a universally recognizable format.

3. The method of claim 1, further comprising:

receiving a command to change one of the key attribute, length attribute, and value attribute of the key frame description scheme.

4. The method of claim 3, wherein the command is sent by one of a user, a client, and a server.

5. The method of claim 1, further comprising:

assigning a weight value to at least one KLV attribute group.

6. The method of claim 1, wherein the further attributes comprise descriptions for the content description scheme data type.

7. An article comprising:

a storage medium including instructions stored thereon which when executed causes a computer system to perform a method comprising:

creating a key frame by instantiating a set of content description schemes and descriptions according to a key frame description scheme, the key frame description scheme comprising a list of KLV (key, length, value) attribute groups, each KLV attribute group comprising a key attribute that identifies a content description scheme data type, a length attribute that specifies a length for a value attribute, and the value attribute that incorporates further attributes used to instantiate the corresponding content description scheme, wherein a content description scheme comprises at least one of another content description scheme and a description;

updating the key frame by re-instantiating a content description scheme as a result of performing at least one of modifying at least one the corresponding KLV attribute group by modifying one of the key attribute, the length attribute, and the value attribute, and modifying a weight value attached to the corresponding KLV attribute group.

8. The article of claim 7, wherein the method further comprises:

configuring a value attribute to reference a plurality of attributes.

9. The article of claim 7, wherein the method further comprises:

describing the KLV attribute groups in a universally recognizable format.

10. The article of claim 7, wherein the method further comprises:

receiving a command to change information in the key frame description.

11. The article of claim 7, wherein the method further comprises:

updating at least one of the further attributes.

12. The article of claim 11, wherein the at least one of the further attributes is one of a syntax attribute and a semantic attribute.

13. The article of claim 7, wherein the method further comprises:

assigning a weighted value to at least one KLV attribute group.

14. The article of claim 7, wherein the further attributes comprise descriptions for the content description scheme data type.

15. A computer system comprising:

a processor coupled to a memory, the memory having stored therein instructions which when executed by the processor cause the processor to generate data and to access a set of KLV (key, length, value) attribute groups for a key frame description scheme that instantiate a set of content description schemes and descriptions for a key frame, each KLV attribute group comprising a key attribute that identifies a content description scheme data type, a value attribute that incorporates further attributes used to instantiate the corresponding content description scheme, and a length attribute that specifies a length for the value attribute, wherein a content description scheme comprises at least one of another content description scheme and a description, and modify the key frame as directed by one of a user, a client, and a server by re-instantiating a content description scheme; and an interconnect coupled to the processor and the memory to allow the data to be transported between the memory and the processor.

16. The system of claim 15, wherein the KLV attribute groups are described in a universally recognizable format.

17. The system of claim 15, wherein the processor further receives a command from an input/output device to change information in the key frame.

18. The system of claim 15, wherein at least one KLV attribute group is assigned a weight value.

19. The system of claim 15, wherein the further attributes comprise descriptions for the content description scheme data type.

* * * * *